(12) United States Patent
Hicks et al.

(10) Patent No.: US 7,734,548 B2
(45) Date of Patent: Jun. 8, 2010

(54) METHODS, SYSTEMS, AND PRODUCTS FOR PROVIDING ELECTRONIC MEDIA

(75) Inventors: John Hicks, Rosewell, GA (US); Randy Zimler, Gainesville, GA (US)

(73) Assignee: AT&T Intellectual Property, I,L.P., Reno, NV (US)

( * ) Notice: Subject to any disclaimer, the term of this patent is extended or adjusted under 35 U.S.C. 154(b) by 773 days.

(21) Appl. No.: 11/005,535

(22) Filed: Dec. 6, 2004

(65) Prior Publication Data

US 2006/0122938 A1   Jun. 8, 2006

(51) Int. Cl.
*G06F 17/00* (2006.01)
*G06F 15/16* (2006.01)

(52) U.S. Cl. .................... 705/58; 705/51; 709/229; 709/219

(58) Field of Classification Search ............ 707/200; 705/59, 52, 26; 713/165; 709/221, 231; 711/154
See application file for complete search history.

(56) References Cited

U.S. PATENT DOCUMENTS

| | | | | |
|---|---|---|---|---|
| 5,883,955 A | * | 3/1999 | Ronning | 705/52 |
| 5,892,900 A | * | 4/1999 | Ginter et al. | 726/26 |
| 5,903,647 A | * | 5/1999 | Ronning | 705/57 |
| 5,933,498 A | * | 8/1999 | Schneck et al. | 705/54 |
| 6,385,596 B1 | * | 5/2002 | Wiser et al. | 705/51 |
| 6,470,392 B1 | * | 10/2002 | Murase et al. | 709/231 |
| 6,647,417 B1 | * | 11/2003 | Hunter et al. | 709/225 |
| 6,654,757 B1 | * | 11/2003 | Stern | 707/101 |
| 6,868,403 B1 | * | 3/2005 | Wiser et al. | 705/51 |
| 6,928,419 B2 | * | 8/2005 | Stefik et al. | 705/51 |
| 2002/0052933 A1 | * | 5/2002 | Leonhard et al. | 709/219 |
| 2002/0111912 A1 | * | 8/2002 | Hunter et al. | 705/52 |
| 2002/0138441 A1 | * | 9/2002 | Lopatic | 705/59 |
| 2002/0146122 A1 | * | 10/2002 | Vestergaard et al. | 380/231 |
| 2002/0174010 A1 | * | 11/2002 | Rice, III | 705/14 |
| 2002/0188704 A1 | * | 12/2002 | Gold et al. | 709/229 |
| 2003/0065642 A1 | * | 4/2003 | Zee | 707/1 |
| 2003/0120557 A1 | * | 6/2003 | Evans et al. | 705/26 |
| 2003/0185397 A1 | * | 10/2003 | Ishiguro | 380/277 |
| 2003/0200400 A1 | * | 10/2003 | Nangle | 711/154 |
| 2004/0003398 A1 | * | 1/2004 | Donian et al. | 725/34 |
| 2004/0044697 A1 | * | 3/2004 | Nixon | 707/200 |
| 2004/0249768 A1 | * | 12/2004 | Kontio et al. | 705/65 |
| 2005/0097368 A1 | * | 5/2005 | Peinado et al. | 713/201 |
| 2005/0144016 A1 | * | 6/2005 | Hewitt et al. | 704/278 |
| 2005/0172122 A1 | * | 8/2005 | Risan et al. | 713/165 |
| 2006/0114987 A1 | * | 6/2006 | Roman | 375/240.01 |

* cited by examiner

*Primary Examiner*—Evens J Augustin
(74) *Attorney, Agent, or Firm*—Cantor Colburn LLP

(57) ABSTRACT

Methods, systems, and products are disclosed for providing electronic media to a customer. One method prompts a customer to license a lifetime right to electronic media. The lifetime right allows the customer to experience the electronic media as often as desired. If the customer agrees to license the lifetime right, then the license is electronically stored on behalf of the customer. The licensed electronic media is communicated to the customer via a communications network.

13 Claims, 10 Drawing Sheets

METHODS, SYSTEMS, AND PRODUCTS FOR PROVIDING ELECTRONIC MEDIA

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This patent generally relates to electrical computers, telecommunications, cable networks and, more particularly, to video on-demand services.

Prior art video services all have a common problem. These prior art video services do not truly provide "on-demand" movies, music, games and other media. Video rental services, such as BLOCKBUSTER®, require the customer to inconveniently travel to the rental store to select and to return movies, games, and music (BLOCKBUSTER® is a registered trademark of Blockbuster Inc., 1201 Elm Street, Dallas, Tex. 75270). A newer video service allows the customer to select movies via the Internet, and the customer's selected movies are then mailed to the customer—often several days later. Another new video service utilizes a special set-top box that stores pre-loaded movies. A terrestrial broadcast technology allows the service provider to broadcast new movies to the set-top box. Although the special set-top box is periodically updated with new movies, the customer, again, cannot truly make "on-demand" movies selections. This terrestrial broadcast technology, however, requires a contractual spectrum agreement with a local broadcaster, and this service is only available in limited markets.

Cable and satellite service providers also offer video services. These cable/satellite services, however, are usually not truly "on-demand" services. The cable/satellite service provider selects the movies and schedules programming times. The customer is not able to select the movie of their choice, and the customer must view the movie at the scheduled program time. Only a very few customers receive true "on-demand" video service, and these customers must have a cable/satellite service that provides both analog and digital content to a set-top box. Because both analog and digital content must be provided, few cable/satellite customers have access to this infrastructure.

There is, accordingly, a need in the art for methods and systems of providing "on-demand" video services that allow a customer to select what they watch and when they watch it.

SUMMARY

The aforementioned problems, and other problems, are reduced by methods, computer systems, computer programs, and computer program products that provide electronic media to a customer. This patent, in particular, provides a media on-demand service. The term "on demand" means the customer can select the media they wish to receive, and the customer can select the time to view/hear that media. The term "electronic media" includes movies, music, pictures, games, and/or any electronic content. A customer of this media on-demand service may access any electronic media that is locally stored at the customer's premise. This media on-demand service, however, also provides immediate access to any media stored on a remote media server. Using this service the customer may download their selected media via a broadband terrestrial communications link, such as a digital subscriber line (DSL), a coaxial cable, or a fiber optic line.

This service, however, also allows the customer to purchase intellectual property rights to their selected media. If the customer does not have a license for their selected media, this invention prompts the customer to purchase a license. The license may be a limited license that expires upon the happening of one or more conditions. The license, however, may also be a lifetime license that allows the customer to have certain lifetime rights to the selected media. The lifetime right, however, is akin to owning a copy of the selected media. Because the customer has the valid license, there is no need for the customer to store their media to a hard drive or other mass-storage. The customer may simply request "on-demand" whatever media they validly license, and that media is delivered to the customer. This invention, then, allows the customer to maintain a remote library of media, without the clutter of VHS tapes, CDs, and other physical media.

This patent discloses methods, systems, and products for providing electronic media to a customer. The term "electronic media" includes movie files, audio files, pictures, games, web pages, and/or any electronic bits/bytes/information that can be communicated to/from a computer system. The term "electronic media" also encompasses any file format for the movie files, audio files, pictures, games, web pages, and/or electronic bits/bytes/information. One of the embodiments prompts a customer to license a lifetime right to the electronic media. The lifetime right allows the customer to experience the electronic media as often as desired. If the customer agrees to license the lifetime right, then the license is electronically stored on behalf of the customer. Whenever the customer desires to experience (e.g., view and/or hear) the electronic media, the licensed electronic media is communicated to the customer on-demand via a communications network.

Another of the embodiments describes another method for providing electronic media to a customer. Here the customer is provided a menu of electronic media. The customer makes a selection, and that selection is received from the customer. The customer is prompted to license a lifetime right to the selected electronic media. The lifetime right allows the customer to experience the selected electronic media as often as desired. If the customer agrees to license the lifetime right, then the license is electronically stored for the customer. The licensed electronic media is communicated via a communications network to the customer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments are better understood when the following Detailed Description of the Invention is read with reference to the accompanying drawings, wherein.

DETAILED DESCRIPTION

Figure 1:
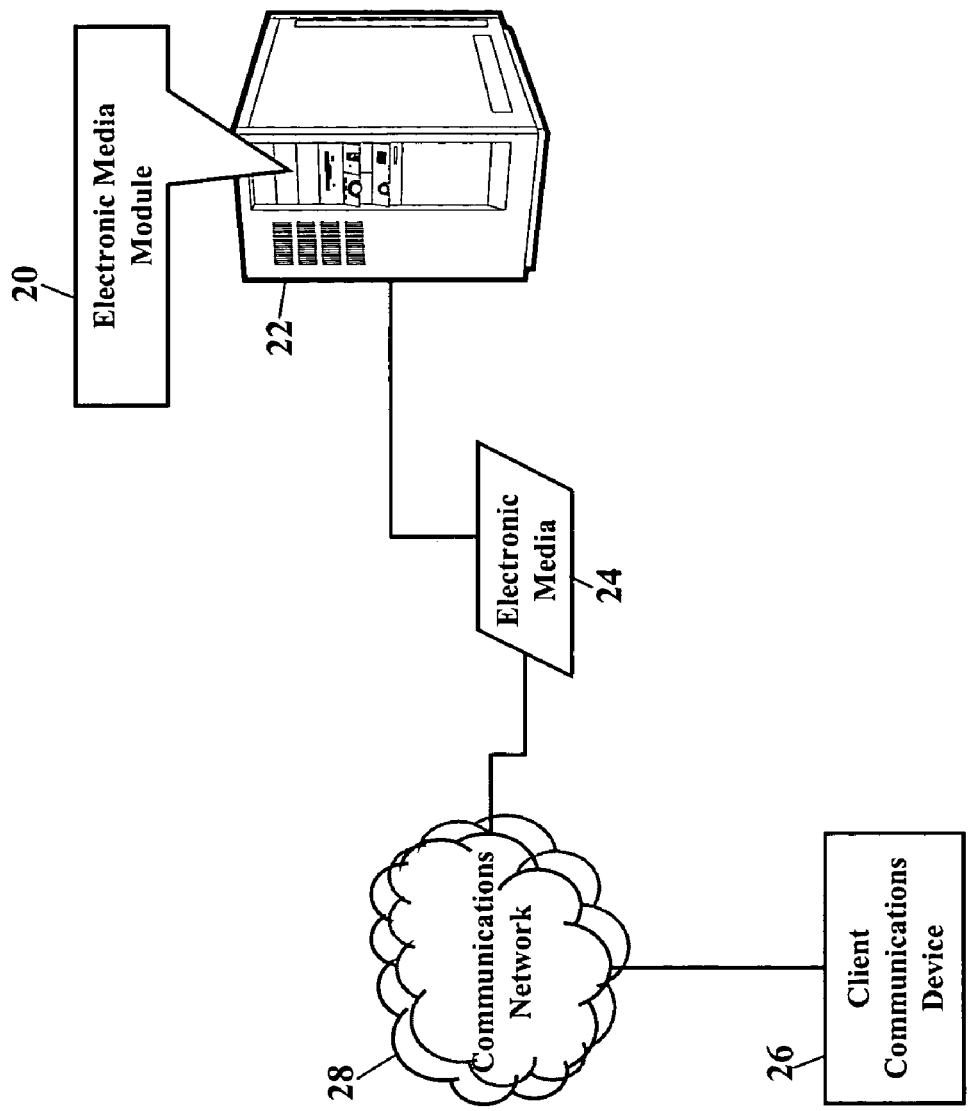
FIG. 1 is a simplified schematic illustrating the embodiments.

This patent now will be described more fully hereinafter with reference to the accompanying drawings, in which exemplary embodiments are shown. This patent may, however, be embodied in many different forms and should not be construed as limited to the embodiments set forth herein. These embodiments are provided so that this disclosure will be thorough and complete and will fully convey the scope to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This patent provides a media on-demand service. A customer of this media on-demand service may access any media that is locally stored at the customer's premise. This media on-demand service, however, also provides immediate access to any media stored on a remote media server. Using this service a customer may download their selected media via a broadband terrestrial communications link, such as a digital subscriber line (DSL), a coaxial cable, or a fiver optic line. This invention, however, also allows the customer to purchase intellectual property rights to their selected media. If the customer does not have a license for their selected media, this invention prompts the customer to purchase a license. The license may be a limited license that expires upon the happening of one or more conditions. The license, however, may also be a lifetime license that allows the customer to have certain lifetime rights to the selected media. The lifetime right, however, is akin to owning a copy of the selected media. Because the customer has the valid license, there is no need for the customer to store their media to a hard drive or other mass-storage. The customer may simply request "on-demand" whatever media they validly license, and that media is delivered to the customer. This invention, then, allows the customer to maintain a remote library of media, without the clutter of VHS tapes, CDs, and other physical media.

FIG. 1 is a simplified schematic illustrating the embodiments. The embodiments of this invention include an Electronic Media Module 20. The Electronic Media Module 20 comprises methods, systems, computer programs, and/or computer program products that provide electronic media to a customer. Although the Electronic Media Module 20 may operate within any computer system, FIG. 1 shows the Electronic Media Module 20 operating within a computer server 22. When the customer selects electronic media to experience, the Electronic Media Module 20 retrieves the selected electronic media 24 and communicates the selected electronic media 24 to the customer. The selected electronic media 24 communicates to the customer's client communications device 26 via a communications network 28. The communications network 28 may comprise a distributed computing network (such as the Internet), a wide-area network (WAN), a local-area network (LAN), a wireless network, a telecommunications network, and/or a secure network. When the customer receives the electronic media 24, the customer may then use the client communications device 26 to experience the electronic media 24. The term "experience" means the customer's client communications device 26 presents the electronic media 24 to the customer, thus allowing the customer to view, hear, feel, smell, or otherwise experience the electronic media 24.

Figure 2:
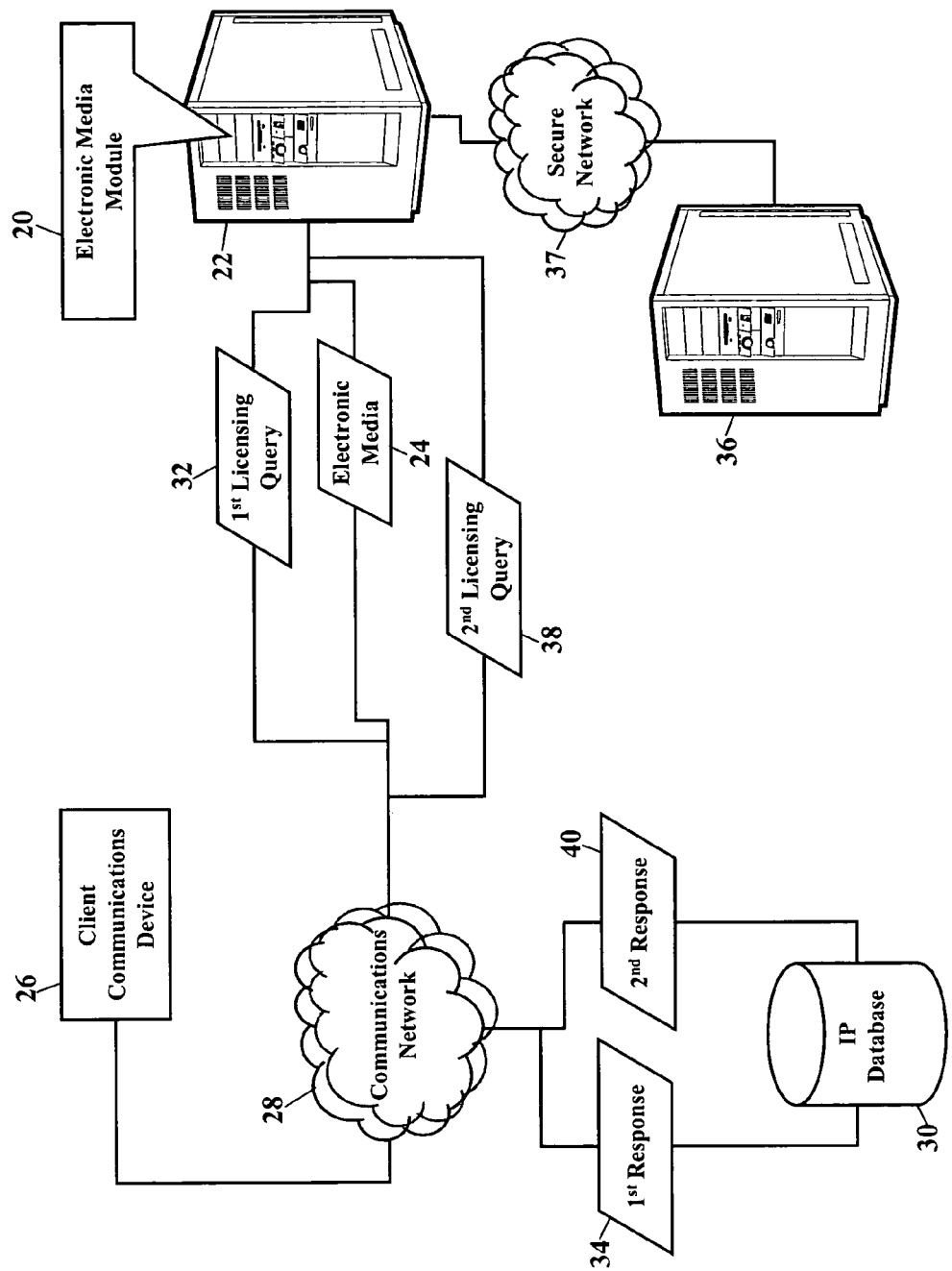
FIG. 2 is a detailed schematic illustrating the embodiments.

FIG. 2 is a detailed schematic illustrating the embodiments. When the customer requests the electronic media 24, this invention also manages digital rights to that electronic media 24. That is, when the customer selects the electronic media 24, this invention first checks to see if the electronic media 24 requires a license. If the electronic media 24 is protected by a United States and/or foreign copyright, trademark, patent, trade secret, or other intellectual property, this invention helps ensure the customer licenses that electronic media 24. When the customer selects the electronic media 24, the Electronic Media Module 20 queries an Intellectual Property database 30 (shown as "IP Database"). The Intellectual Property database 30 stores a list of any electronic media that requires a license. If, for example, the customer desires to download a movie, this invention would first query the Intellectual Property database 30 to determine if the intellectual property owner requires a license to experience the movie. If the intellectual property owner requires a license, the Electronic Media Module 20 also queries the Intellectual Property database 30 to determine if the customer has previously licensed the electronic media 24.

As FIG. 2 shows, then, the Electronic Media Module 20 issues queries to the Intellectual Property database 30. The Electronic Media Module 20 issues a first licensing query 32. The first licensing query 32 inquires whether the intellectual property owner requires a license to experience the electronic media 24. The first licensing query 32 communicates to the Intellectual Property database 30 via the communications network 28. The Intellectual Property database 30 return communicates a first response 34 via the communications network 28. If the first response 34 indicates no license is required, then the Electronic Media Module 20 retrieves the selected electronic media 24 from a media server 36. The Electronic Media Module 20 may communicate with the media server 36 via the communications network 28. FIG. 2, however, shows the Electronic Media Module 20 communicating with the media server 36 via a secure network 37. The Electronic Media Module 20 then forwards the selected electronic media 24 to the customer's client communications device 26. The Electronic Media Module 20 may alternatively or additionally instruct the media server 36 to communicate the selected electronic media 24 to the customer's client communications device 26.

If, however, a license is required, an additional query is made. This patent, as explained above, first queries the Intellectual Property database 30 to determine if the intellectual property owner requires a license to experience the selected electronic media 24. If the first response 34 indicates a license is required, then the Electronic Media Module 20 also queries the Intellectual Property database 30 to determine if the customer has previously licensed the electronic media 24. If the customer has a valid licensed for the electronic media 24, then, again, the electronic media 24 is communicated to the customer. If, however, the customer has no license, or if a previous license has expired, then the customer must purchase a new license. The Electronic Media Module 20, then issues a second licensing query 38. The second licensing query 38 inquires whether the customer has a valid license for the electronic media 24. The second licensing query 38 communicates to the Intellectual Property database 30 via the communications network 28. The Intellectual Property database 30 return communicates a second response 40 via the communications network 28. If the second response 40 indicates a valid license exists, then the Electronic Media Module 20 retrieves the selected electronic media 24 from the media server 36. The Electronic Media Module 20 then forwards the selected electronic media 24 to the customer's client communications device 26. The Electronic Media Module 20 may alternatively or additionally instruct the media server 36 to communicate the selected electronic media 24 to the customer's client communications device 26.

Figure 3:
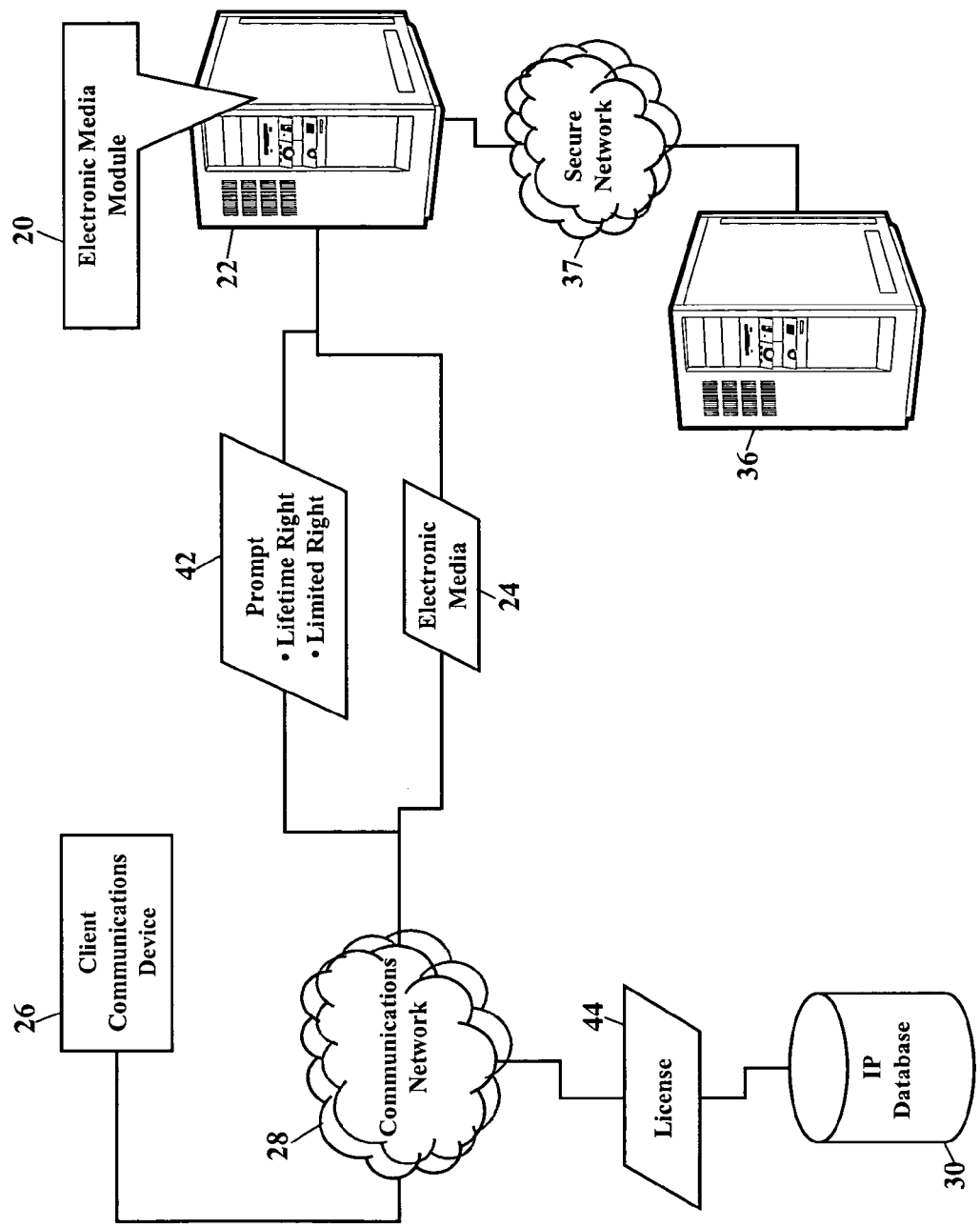
FIG. 3 is another detailed schematic illustrating the embodiments.

FIG. 3 is another detailed schematic illustrating the embodiments. If the customer desires to download unlicensed electronic media, the Electronic Media Module 20 prompts the customer to purchase a license. The Electronic Media Module 20 constructs a prompt 42. The prompt 42 communicates to the customer's client communications device 26 via the communications network 28. The prompt 42 audibly and/or visually prompts the customer to purchase a license for the selected electronic media 24. The prompt 42, for example, asks the customer to license a lifetime right to the selected electronic media 24. The lifetime right allows the customer to experience the selected electronic media 24 as often as desired. The prompt 42 may additionally or alternatively ask the customer to license a limited right to the selected electronic media 24. The limited right includes one or more conditions that cause the limited right to expire. Whether the customer agrees to license the lifetime right or the limited right, a license 44 is electronically stored in the Intellectual Property database 30. Once the customer agrees to license the selected electronic media 24, then the Electronic Media Module 20 retrieves the selected electronic media 24 from the media server 36. The Electronic Media Module 20 then forwards the selected electronic media 24 to the customer's client communications device 26. The Electronic Media Module 20 may alternatively or additionally instruct the media server 36 to communicate the selected electronic media 24 to the customer's client communications device 26.

The limited right expires. The limited right includes one or more conditions that cause the limited right to expire. The condition might be a measure of time, a number of views or "plays," a number of initializations/executions, or any other measure the intellectual property owner might require. The limited right might expire, for example, after forty eight (48) hours (similar to renting a physical video tape/DVD). An audio recording might only be played ten (10) times before expiring. A game might be played three (3) times before expiring. The limited right might also include programming/coding that prevents locally saving the media to a storage device. The intellectual property owner specifies the conditions that cause the limited right to expire, and these conditions would preferably be presented to the customer before download. If the customer cannot agree to the conditions, the customer is permitted to make another selection.

The lifetime right, however, is akin to owning a copy of the selected electronic media 24. The lifetime right allows the customer to experience the selected electronic media 24 as often as desired. If the selected electronic media 24 is a digital movie, music, or game, for example, the lifetime right allows the customer to view, listen, and/or play the media whenever the customer desires. The lifetime right is granted by the intellectual property owner and grants the customer rights to the media. Because the customer has the lifetime right, the customer is permitted unlimited downloads of the selected electronic media 24. The lifetime right means the customer need not maintain a physical copy of the selected electronic media 24. If the customer has the lifetime right to the selected electronic media 24, the customer simply requests a download. The lifetime right is akin to owning a copy of the selected electronic media 24, without the clutter of VHS tapes, CDs, and other physical media.

This concept, then, allows for remote storage of the customer's media collection. If the customer has a valid license for the selected electronic media 24, there is no need for the customer to maintain a vast, cumbersome physical collection of tapes and compact disks. Whenever the customer desires to view a movie or listen to an audio compact disk, the customer need only request the electronic media from the media server 36. If the customer owns the license 44, the customer may download the selected electronic media 24 according to the terms of the license 44. The customer, then, may "on-demand" request any media in their personal remote archive collection. Moreover, the customer is not required to locally store the selected media 24. Because the customer has the valid license 44, there is no need for the customer to store their media to a hard drive or other mass-storage. The customer may simply request "on-demand" whatever media they validly license, and that media is delivered to the customer's client communications device 26. The customer may also quickly and easily purchase a license to additional media, via the prompt 42 described above. The customer could even download their own home movies, old recordings, audio files, and other content to the media server 36. This invention, then, allows the customer to maintain a remote library of media, without the clutter of VHS tapes, CDs, and other physical media.

Figure 4:
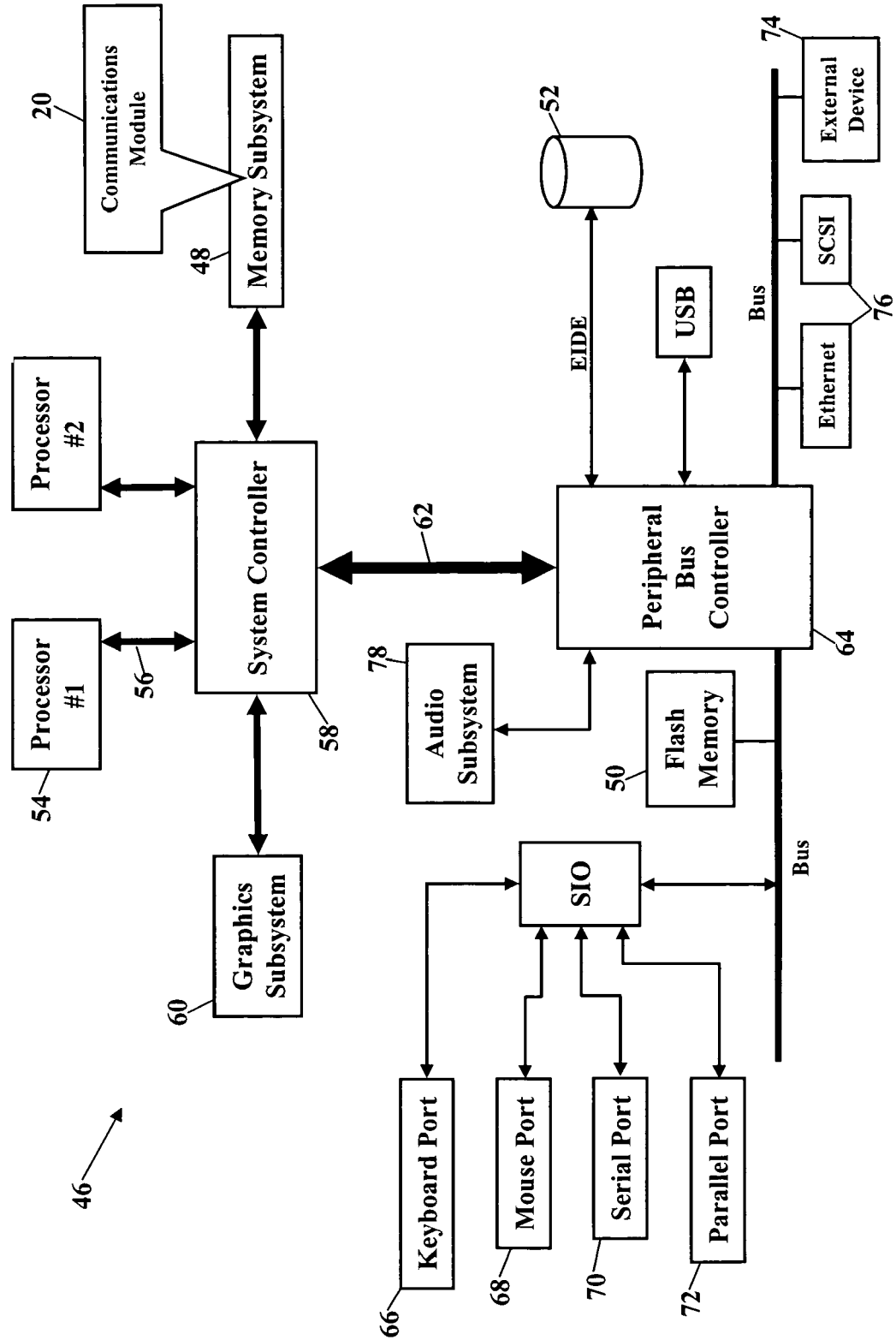
FIG. 4 depicts another possible operating environment for the embodiments.

FIG. 4 depicts another possible operating environment for the embodiments. FIG. 4 is a block diagram showing the Electronic Media Module 20 residing in a computer system 46. The computer system 46 may be any computing system, such as the computer server and the media server (shown, respectively, as reference numerals 22 and 36 in FIGS. 1-3) or any other computer device. As FIG. 4 shows, the Electronic Media Module 20 operates within a system memory device. The Electronic Media Module 20, for example, is shown residing in a memory subsystem 48. The Electronic Media Module 20, however, could also reside in flash memory 50 or a peripheral storage device 52. The computer system 46 also has one or more central processors 54 executing an operating system. The operating system, as is well known, has a set of instructions that control the internal functions of the computer system 46. A system bus 56 communicates signals, such as data signals, control signals, and address signals, between the central processor 54 and a system controller 58 (typically called a "Northbridge"). The system controller 58 provides a bridging function between the one or more central processors 54, a graphics subsystem 60, the memory subsystem 48, and a PCI (Peripheral Controller Interface) bus 62. The PCI bus 62 is controlled by a Peripheral Bus Controller 64. The Peripheral Bus Controller 64 (typically called a "Southbridge") is an integrated circuit that serves as an input/output hub for various peripheral ports. These peripheral ports are shown including a keyboard port 66, a mouse port 68, a serial port 70 and/or a parallel port 72 for a video display unit, one or more external device ports 74, and networking ports 76 (such as SCSI or Ethernet). The Peripheral Bus Controller 58 also includes an audio subsystem 78. Those of ordinary skill in the art understand that the program, processes, methods, and systems described in this patent are not limited to any particular computer system or computer hardware.

Those of ordinary skill in the art also understand the central processor 54 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 48, flash memory 50, or peripheral storage device 52) may also contain an application program. The application program cooperates with the operating system and with a video display unit (via the serial port 70 and/or the parallel port 72) to provide a Graphical User Interface (GUI). The Graphical User Interface typically includes a combination of signals communicated along the keyboard port 66 and the mouse port 68. The Graphical User Interface provides a convenient visual and/or audible interface with a user of the computer system 46.

Figure 5:
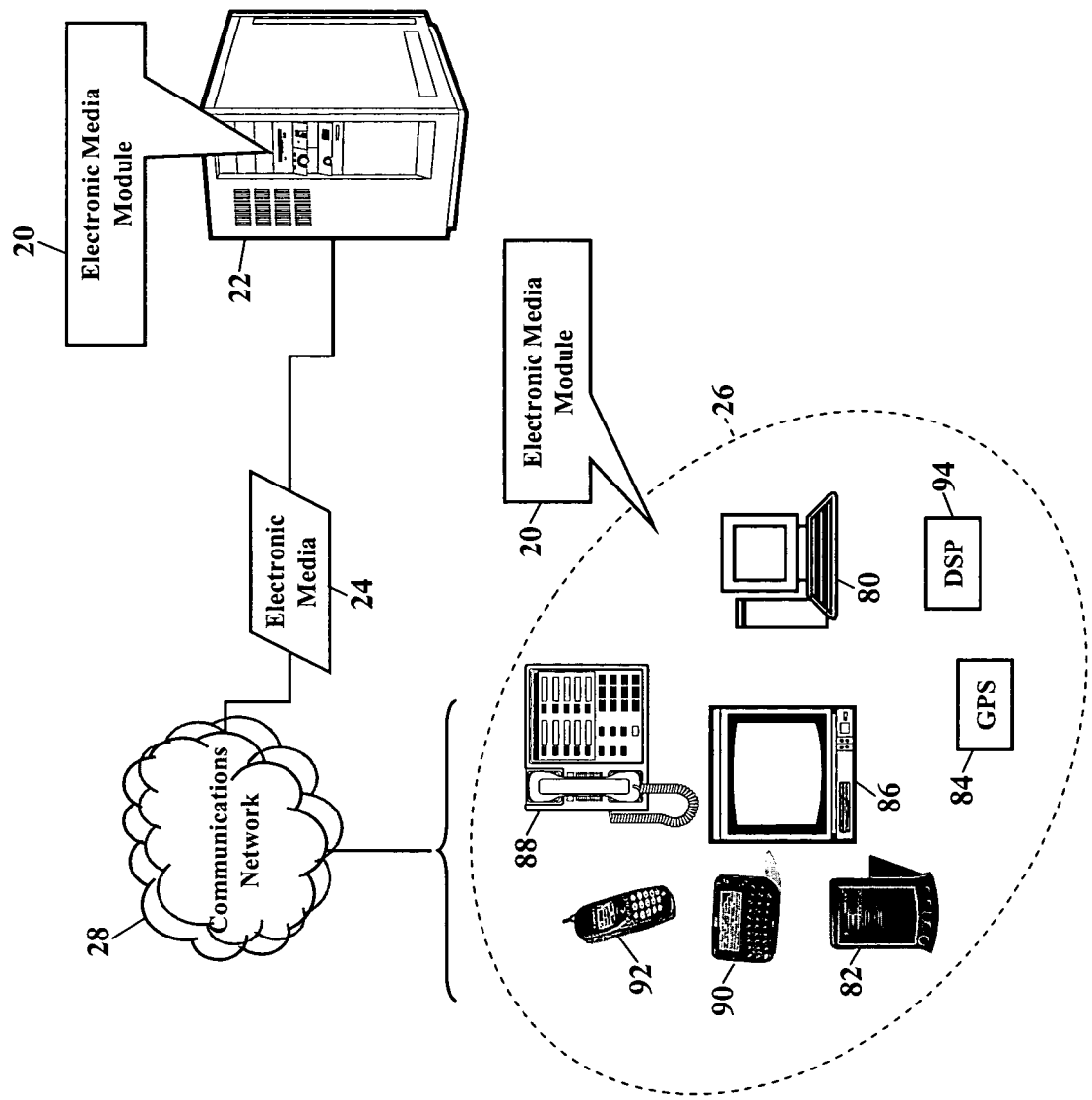
FIG. 5 is a schematic illustrating various customer client communications devices.

FIG. 5 is a schematic illustrating various customer client communications devices 26. This patent comprises methods, systems, computer programs, and/or computer program products that provide electronic media to the customer's client communications devices 26. As FIG. 5 shows, the Electronic Media Module 20 may communicate with a computer 80 (laptop, desktop, tablet, server, and other computer systems), a personal digital assistant (PDA) 82, a Global Positioning System (GPS) device 84, an interactive television 86, an Internet Protocol (IP) phone 88, a pager 90, a cellular/satellite phone 92, or any computer and/or communications device utilizing a digital signal processor (DSP) 94. The customer's client communications devices 26 may also include watches, set-top boxes, radios, vehicles, clocks, printers, gateways, and other apparatuses and systems. This invention may further utilize wired and/or wireless infrastructures when communicating with the customer's client communications device 26. If a wireless infrastructure is utilized, this invention may use any portion of the electromagnetic spectrum, and this invention may use any signaling standard (such as CDMA, TDMA, GSM, and variants, and the I.E.E.E. 802 family of standards). FIG. 5 also illustrates that any portion of the Electronic Media Module 20 may operate within the customer's client communications devices 26.

Figure 6:
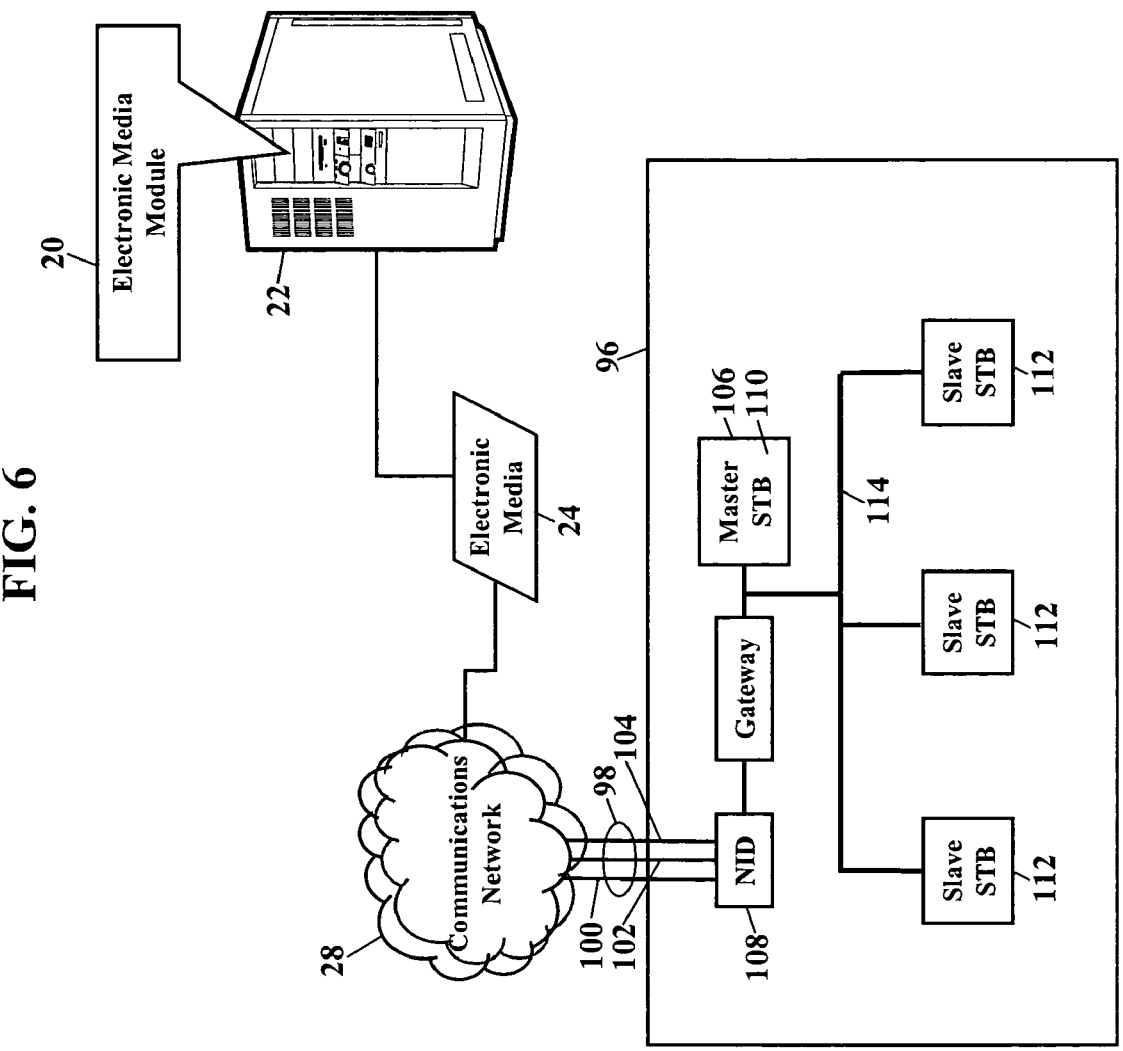
FIG. 6 is another detailed schematic illustrating the embodiments.

FIG. 6 is another detailed schematic illustrating the embodiments. FIG. 6 shows the customer's premises 96 receiving the selected electronic media 24 via the communications network 28. Here the customer's premises 96 receives the selected electronic media 24 via terrestrial communications link 98 communicating with the communications network 28. This terrestrial communications link 98 may be a fiber-optic line 100, a coaxial cable 102, and/or a digital subscriber line (DSL) 104. The selected electronic media 24 is delivered to a master set-top box (STB) 106 via a network interface device (ND) 108. The customer may access any media stored on a hard drive 110 in the set-top box 106. The media on-demand service described in this patent also allows the customer to download any validly licensed media via the terrestrial communications link 98 and the communications network 28. This media on-demand service allows the customer to purchase lifetime/limited rights to media, thus allowing the customer to download the media according to the terms of the license. The customer may even have one or more slave set-top boxes 112. If the customer desires to stream media from the master set-top box 106 to a slave set-top box 112, the master set-top box 106 could use a power line carrier network 114. This power line carrier-based network 114 distributes data signals over existing electrical wiring. This power line carrier-based network 114 sends information over a 120 volt, 60 Hz (or 220 volt, 50 Hz in Europe) electrical power distribution system within the customer's premises 96.

Figure 7:
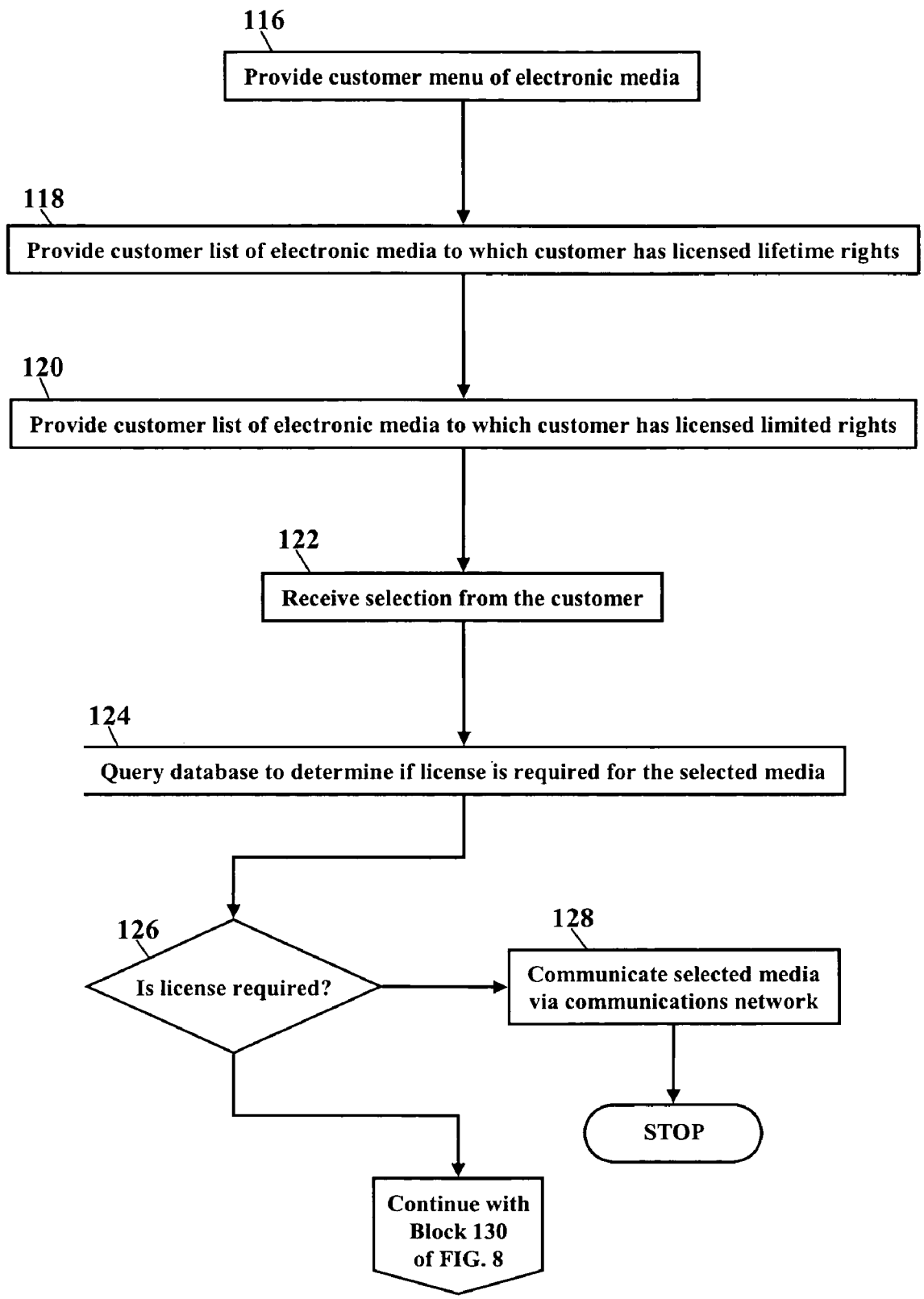
FIGS. 7 and 8 are flowcharts illustrating a method of providing electronic media to a customer, according to more embodiments.
Figure 8:
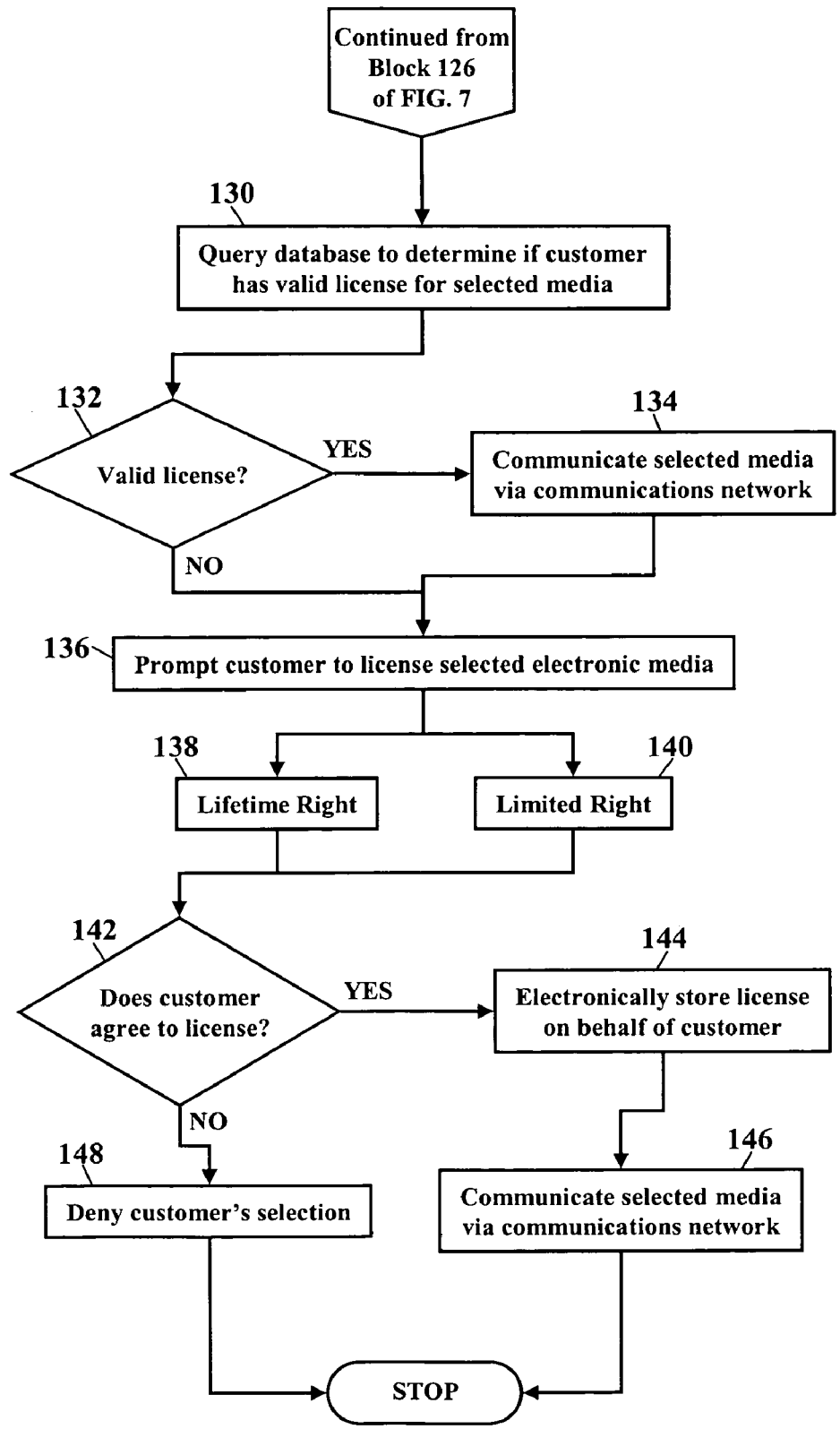

FIGS. 7 and 8 are flowcharts illustrating a method of providing electronic media to a customer. The customer is provided a menu of electronic media (Block 116). The term "electronic media" includes movie files, audio files, pictures, games, web pages, and/or any electronic bits/bytes/information that can be communicated to/from a computer system. The term "electronic media" also encompasses any file format for the movie files, audio files, pictures, games, web pages, and/or electronic bits/bytes/information. The customer may also be provided a list of electronic media to which the customer has licensed lifetime rights (Block 118) and/or a list of electronic media to which the customer has licensed limited rights (Block 120). A selection is received from the customer (Block 122). A database is queried to determine if a license is required for the selected media (Block 124). If no license is required (Block 126), then the selected media is communicated via a communications network (Block 128).

The flowchart continues with FIG. 8. If a license is required (shown as Block 126 in FIG. 7), then the database is queried to determine if the customer has a valid license for the selected media (Block 130). If the customer has a valid license (Block 132), then the selected media is communicated via a communications network (Block 134). If the customer does not have a valid license (Block 132), then the customer is prompted to license the selected electronic media (Block 136). The customer may be prompted to license a lifetime right (Block 138) and/or a limited right (Block 140) to the selected electronic media. The lifetime right allows the customer to experience the selected electronic media as often as desired, whereas the limited right has one or more conditions that cause the limited right to expire. If the customer agrees to license the selected electronic media (Block 142), then that license is electronically stored on behalf of the customer (Block 144) and the licensed electronic media is communicated via the communications network (Block 146). If the customer declines to license the selected electronic media (Block 142), then the customer's selection is denied (Block 148).

Figure 9:
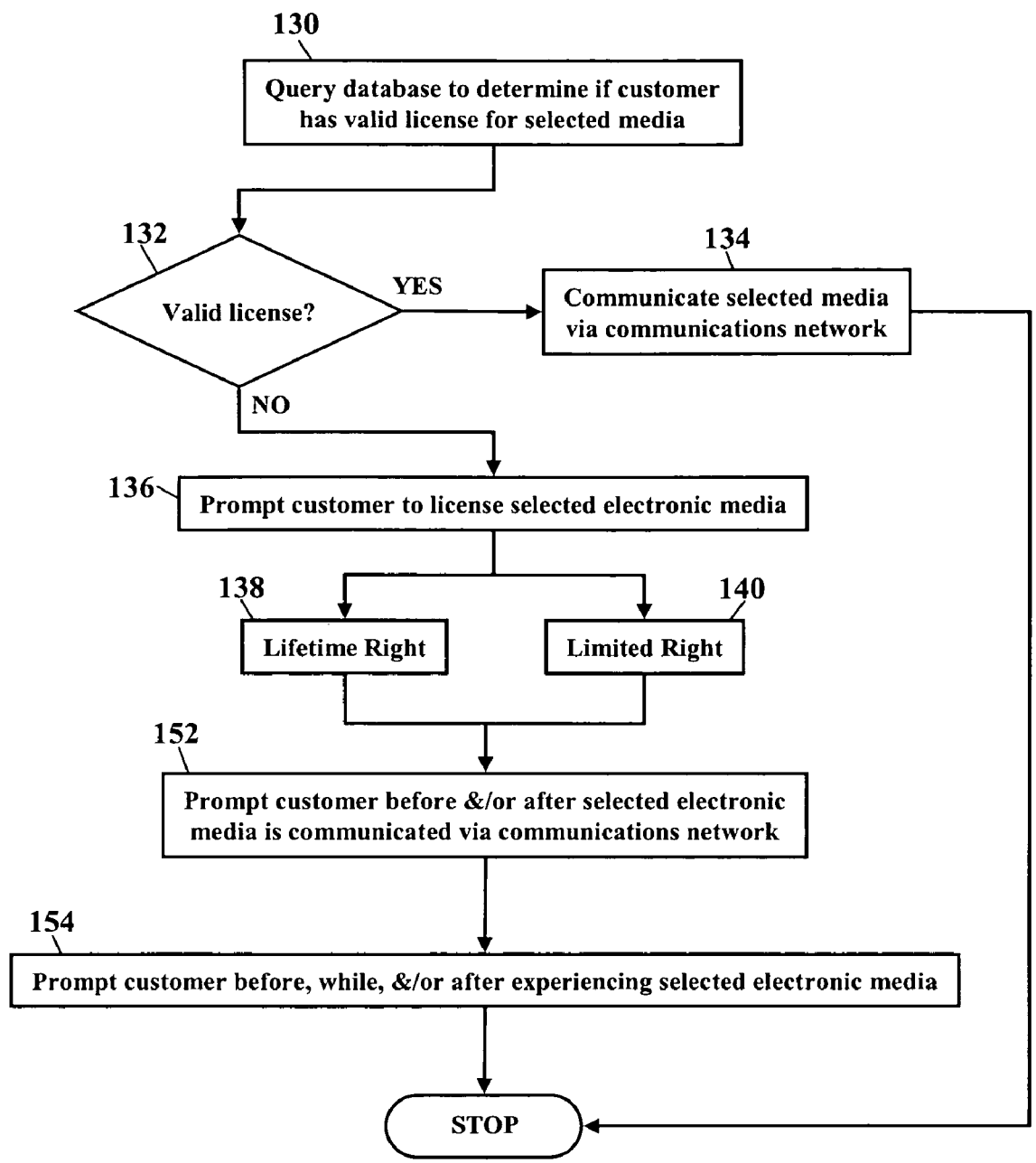
FIG. 9 is a flowchart illustrating another method of providing electronic media to a customer, according to even more embodiments.

FIG. 9 is a flowchart illustrating another method of providing electronic media to a customer. If the customer does not have a valid license for the selected electronic media (Block 132), the customer is prompted to license the selected electronic media (Block 136). The customer may be prompted to license a lifetime right (Block 138) and/or a limited right (Block 140) to the selected electronic media. The customer may be prompted before and/or after the selected electronic media is communicated via the communications network (Block 150). The customer may alternatively or additionally be prompted before, while, and/or after the customer experiences the selected electronic media (Block 152). If the customer is viewing a movie, for example, the movie could automatically pause while the customer is prompted. The placement of the prompt could be timed to coincide with features and/or events occurring in the movie.

Figure 10:
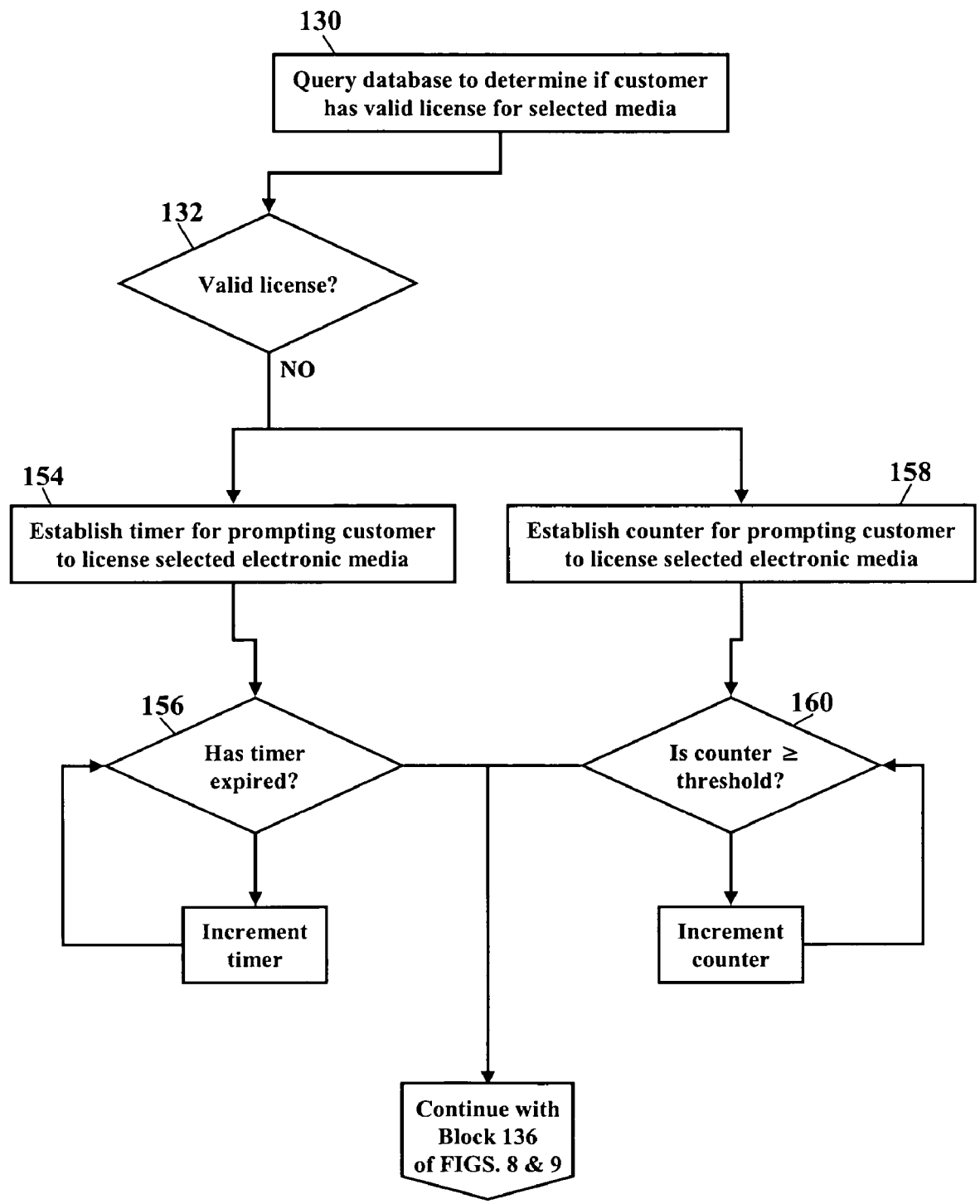
FIG. 10 is a flowchart illustrating yet another method of providing electronic media to a customer, according to even more embodiments.

FIG. 10 is a flowchart illustrating yet another method of providing electronic media to a customer. If the customer does not have a valid license for the selected electronic media (Block 132), a timer is established for prompting the customer to license the selected electronic media (Block 154). When the timer expires (Block 156), then the customer is prompted to license a lifetime right and/or a limited right (see Blocks 138 and 140 in FIGS. 8 ad 9) to the selected electronic media. This timer could be set to a percentage value of the total time of the media. If, for example, a movie is two (2) hours in length, the timer could be set to fifty percent (50%). At sixty minutes, then, the timer expires and the customer is prompted. This method may additionally or alternatively establish a byte counter for prompting the customer to license the selected electronic media (Block 158). When the counter equals or exceeds a threshold byte value (Block 160), then the customer is prompted to license the lifetime right and/or the limited right to the selected electronic media. This counter could be set to a percentage value of the total bytes of the media. If, for example, a movie file is one gigabyte, the counter threshold could be set to fifty percent (50%). At 500 MB, then, the counter threshold is met and the customer is prompted. When the customer agrees to license the selected electronic media, a royalty payment for the license may be made directly to the intellectual property owner. A royalty payment may even be initiated via a credit card processing center.

The Electronic Media Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Electronic Media Module to be easily disseminated. A computer program product for providing electronic media includes the Electronic Media Module stored on the computer-readable medium. The Electronic Media Module determines whether a customer has a valid license for a requested media on-demand file. If no license is valid, the Electronic Media Module prompts the customer to license the electronic media.

The Electronic Media Module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the concepts have been described with respect to various features, aspects, and embodiments, those skilled and unskilled in the art will recognize the patent is not so limited. Other variations, modifications, and alternative embodiments may be made without departing from the spirit and scope of the present invention.

What is claimed is:

1. A method of providing electronic media to a customer, comprising:

providing the customer a menu of electronic media;

receiving a selection from the customer;

retrieving and communicating the selected electronic media via a communications network;

establishing a byte counter that increments with each byte of the selected electronic media communicated to the customer;

establishing a threshold byte value having a percentage value of a total number of bytes of the selected electronic media;

when the byte counter equals or exceeds the threshold byte value, then pausing retrieval of the selected electronic media;

prompting the customer to license a lifetime right to the selected electronic media, the lifetime right allowing the customer to experience the selected electronic media as often as desired; and when the customer agrees to license the lifetime right, then resuming retrieval of the selected electronic media.

2. A method according to claim 1, further comprising providing the customer a list of electronic media to which the customer has licensed lifetime rights.

3. A method according to claim 1, wherein if the customer declines to license the lifetime right, then further comprising prompting the customer to license a limited right to the selected electronic media, the limited right having a condition that causes the limited right to expire.

4. A method according to claim 1, further comprising providing the customer a list of electronic media to which the customer has licensed limited rights.

5. A method according to claim 1, wherein prompting the customer comprises prompting the customer before the byte counter equals or exceeds the threshold byte value.

6. A method according to claim 1, wherein prompting the customer comprises prompting the customer after the byte counter equals or exceeds the threshold byte value.

7. A method according to claim 1, wherein prompting the customer comprises prompting the customer while continuing to retrieve and communicate the selected electronic media.

8. A method according to claim 1, wherein prompting the customer comprises prompting the customer after the byte counter equals or exceeds the threshold byte value.

9. A method according to claim 1, further comprising establishing a timer for prompting the customer to license the lifetime right.

10. A method according to claim 1, wherein when the timer expires, then prompting the customer to license the lifetime right.

11. A method according to claim 1, further comprising initiating a royalty payment for the license.

12. A method according to claim 1, wherein providing the customer a menu of electronic media comprises providing a menu of movie files available for download.

13. A method according to claim 1, wherein providing the customer a menu of electronic media comprises providing a menu of audio files available for download.

* * * * *